US012786941B2

(12) United States Patent
Bloechl

(10) Patent No.: US 12,786,941 B2
(45) Date of Patent: Nov. 3, 2026

(54) REAL-TIME LOCATION SYSTEM USING SELF-LOCALIZING NODES

(71) Applicant: Link Labs, Inc., Annapolis, MD (US)

(72) Inventor: Mark O. Bloechl, Annapolis, MD (US)

(73) Assignee: Link Labs, Inc., Oakville (CA)

( * ) Notice: Subject to any disclaimer, the term of this patent is extended or adjusted under 35 U.S.C. 154(b) by 191 days.

(21) Appl. No.: 18/767,455

(22) Filed: Jul. 9, 2024

(65) Prior Publication Data

US 2026/0019978 A1 Jan. 15, 2026

(51) Int. Cl.
*H04W 64/00* (2009.01)

(52) U.S. Cl.
CPC .................................. *H04W 64/00* (2013.01)

(58) Field of Classification Search
CPC ..................................................... H04W 64/00
USPC ...................................................... 455/456.1
See application file for complete search history.

(56) References Cited

U.S. PATENT DOCUMENTS 11,852,713 B1 12/2023 Bloechl
12,078,713 B1 9/2024 Bloechl
2019/0172165 A1* 6/2019 Verteletskyi ......... G01C 21/206
2019/0204430 A1* 7/2019 Schmidt .................. G01S 3/803
2020/0169336 A1* 5/2020 Modarres Razavi .. H04B 17/27
2022/0210620 A1* 6/2022 Wahl .................. H04W 56/001
2023/0063193 A1* 3/2023 Wahl ..................... G01S 5/0205
2025/0300695 A1* 9/2025 Park ....................... H04B 7/024

* cited by examiner

*Primary Examiner* — Mark G. Pannell
(74) *Attorney, Agent, or Firm* — Charles B. Lobsenz; Brian H. Buck

(57) ABSTRACT

Provided are a system and method for a real-time location system (RTLS) optimizing manner of establishing node location, and specifically, beacon location according to which positioning for a tag may be determined. To realize the optimization, beacons are arranged in "pods" and are led in their communications by a pod master beacon (MB) such that others of the pod beacons are slaves, i.e., slave beacons (SBs) to the MB. The communications are sequenced according to serialized transmit and receive staging among the MB and SBs resulting in self-localization of the pod beacons. The staging enables the MB to determine and accumulate various MB-SB and SB-SB measurements from which a mapping of the pods may be resolved.

26 Claims, 3 Drawing Sheets

REAL-TIME LOCATION SYSTEM USING SELF-LOCALIZING NODES

FIELD OF THE DISCLOSURE

Disclosed embodiments relate to a real-time location system (RTLS), and more specifically, to such an RTLS including beacon nodes which participate in a series of communications therebetween that result in self-localizing measurements contributing to a mapping of the nodes.

BACKGROUND

In any RTLS, it is critical to accurately know the location of constituent positioning nodes, such as beacons, so that a location of a tag to be located can be relied upon. For instance, if the locations of the beacons are erroneous, so, too, will be the location of the tag. This can particularly be the case where ranging distances between nodes is reliant upon a particular ranging method, such as time difference of arrival (TDOA) in which synchronization of signaling can, in the face of erroneous beacon location, be skewed.

Once the distances between beacons are accumulated, it is often the case that they are then fed to a positioning algorithm that derives their relative positioning so as to yield a mapping of the beacons. In some circumstances, however, the manner in which the distances are acquired is impeded by beacon location or other factors such as multipath interference.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

Embodiments herein may include a system and commensurate method providing a real-time location system (RTLS), including, in a beacon pod comprising a master beacon (MB) and at least first through third slave beacons (SBs), the SBs being in communication with the MB and a portion of the at least first through third SBs being serially in communication with each other during a self-localization frame, of a series thereof, in which the communications yield self-localizing measurements corresponding to the MB and the SBs.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments herein will be more particularly described in conjunction with the following drawings wherein.

DETAILED DESCRIPTION

Figure 1:
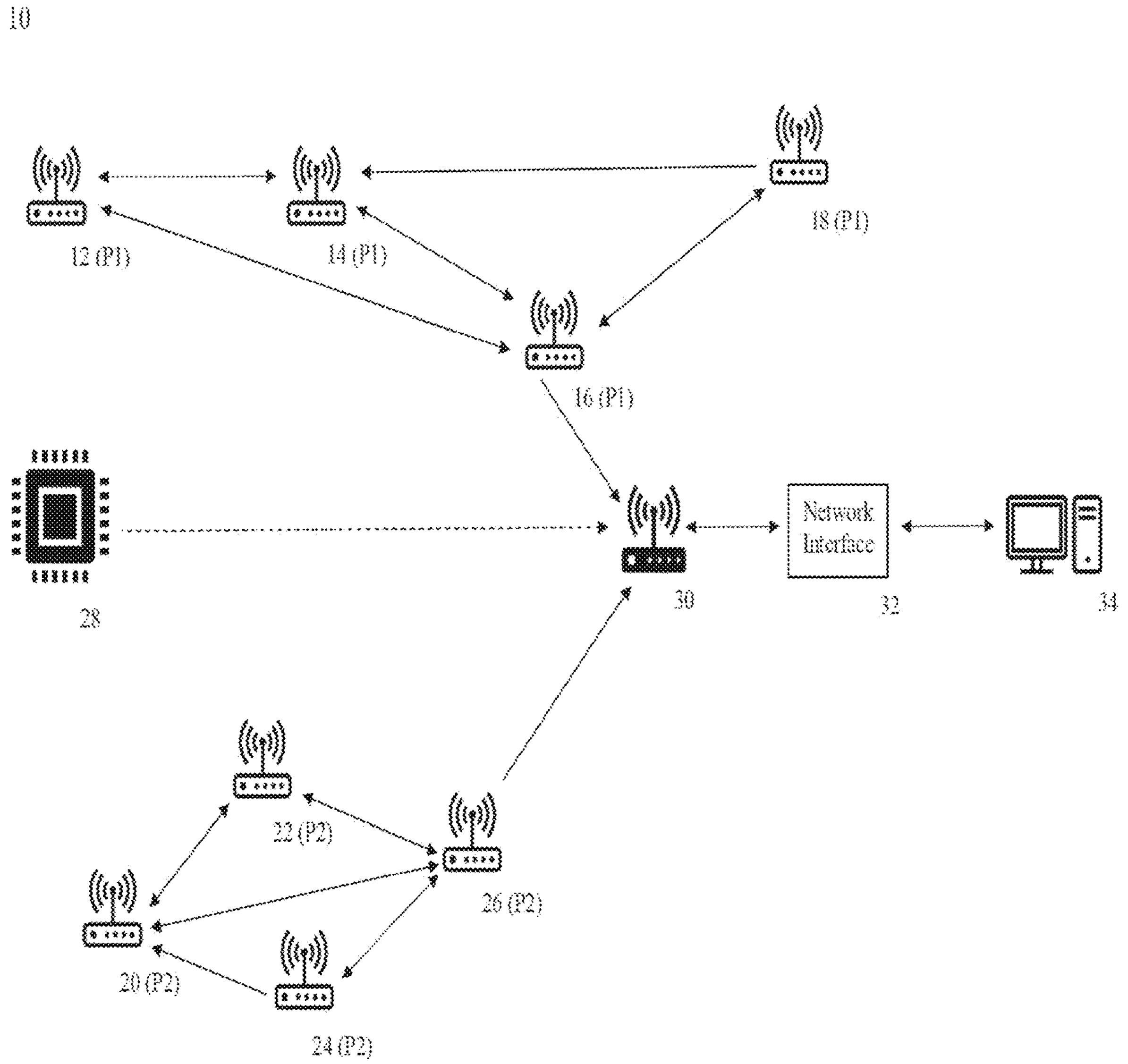
FIG. 1 is an illustration of a real-time location system (RTLS) providing beacon self-localizing measurements, in accordance with embodiments herein.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedure, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol, or other specification and/or guidelines which may be applicable to the transfer of information. Examples of such networks include, PSTN, LAN, WAN, WiFi, LTE, CBRS, and the like.

The phrase "wireless device" is used herein to mean one or more conventional or proprietary devices using radio frequency transmission techniques or any other techniques enabling the transfer of information. Examples of such wireless devices include cellular telephones, desktop computers, laptop computers, handheld computers, electronic games, portable digital assistants, MP3 players, DVD players, or the like.

Bluetooth Low Energy (BLE) networking enables detection and connection among devices that generally do not require continuous connection therebetween in order for an exchange of information in the form of data to occur. Yet, such devices depend upon extended battery life in order that the opportunity for such an exchange may continue to reliably exist. The devices themselves vary in their construction, whether, for example, a sensor, a cellphone, a network access point, or some other object configured to enable and/or provide BLE communication(s) and which is either stationary or mobile, such as a BLUETOOTH tag. In the context of BLE networking, such devices are prescribed by the BLUETOOTH Core Specification 4.0 and are compatible with IEEE 802.15.1, as appropriate.

As will be discussed, embodiments herein may encompass signaling on one or more devices equipped according to an "XLE" wireless communications protocol, wherein such protocol is a low energy consumption protocol such as BLUETOOTH LOW ENERGY (BLE) or THREAD, and otherwise an ULTRA-WIDEBAND (UWB) protocol, or, for example, on a combination of such protocols relative to selective operations between system nodes (i.e., wireless communications nodes (WCNs)) that exchange such signaling. When conducting signaling that is available for ranging among nodes represented by the various devices, it can be advantageous to coordinate use of the combination of protocols to reduce energy consumption at the nodes. For instance, and as will be understood from the discussion(s) below, such coordination can be implemented in accordance with an arranged sequencing of discrete use of the protocols.

Referring to FIG. 1, a description of a communications system 10 implementing a real-time location system (RTLS) according to an embodiment is provided. System 10 and its components may each be configured to be operable in accordance with one or more of XLE and UWB protocols (as protocols 1 and 2, respectively), such that each of the aforementioned components are configured for communications according to a selected one of such protocols at a first time and the other of such protocols at a second time. System 10 typically includes multiple tags 28—only one of which is shown in FIG. 1 for clarity. Tag 28 may be attached to or associated with a particular object for the purposes of tracking a changing location of that object. Tags 28 are capable of wirelessly communicating with other components of system 10 as more fully described herein. System 10 also includes a plurality of beacons 12, 14, 16, 18, 20, 22, 24, and 26 (as an exemplary number thereof such that more or less beacons can be provided) which also communicate wirelessly with other components of system 10 such as with tags 28 (such communications being omitted in the interest of clarity of expression of embodiments herein). Such beacons are located at very specific geographic locations within the area within which objects are to be tracked. The beacons are installed in these locations and at a time of installation, their specific locations are determined, according to embodiments discussed hereinbelow, for entry into system 10 so that system 10 is always aware of the known exact physical locations of the aforementioned beacons. Herein and in order to derive those physical locations, as discussed hereinbelow, the beacons 12, 14, 16, 18, 20, 22, 24, and 26 shown in FIG. 1 may be aggregated into respective, exemplary beacon pods P1 and P2 (as indicated), such that pod P1 comprises a master beacon (MB) 16, and slave beacons (SBs) 12, 14, and 18 and P2 comprises a MB 26 and SBs 20, 22, and 24. As will be understood in connection with discussion of FIGS. 2-3 below, each of the SBs are (as shown by the double-ended arrow indications) in communication with their respective MB and variously in communication with each other to achieve self-localizing measurements from which a mapping of the relative positions of the beacons can be developed.

System 100 may also include one or more access points 30. These access points 30 may also serve in the same capacity as the aforementioned beacons in that their location is known to system 10 and such that they may communicate with tags 28 (shown in dashed arrow in FIG. 1, and) as described herein for the purpose of location determination as more fully described herein. In addition, access points 30, if present, also provide a connection to network interface 32 which permits data to be shared with and received from other networks such as the internet. This functionality may alternatively be provided by one or more of the aforementioned beacons in lieu of access point 30. In one embodiment, data is transmitted and received via backhaul to the internet such that a cloud based application may be accessed by a user via client 34 to view object location information and also to allow the user to configure various aspects related to the functionality of system 10.

Tags 28 are responsible for executing any coordinate location determination process locally and then reporting the location determination to system 10 via a communication to an access point 30 (or an aforementioned beacon). In an embodiment, each tag 28 may individually report such a corresponding location determination via its own respective backhaul. See, for example, U.S. Pat. No. 10,264,436 entitled, "BLE NETWORKING SYSTEMS AND METHODS PROVIDING CENTRAL AND PERIPHERAL ROLE REVERSAL WITH INDEPENDENT PERIPHERAL NETWORK CONNECTIVITY," which is commonly owned by the assignee of the present application and incorporated by reference herein.

In this regard and when still referring to FIG. 1, XLE communications between a tag 28 and an aforementioned beacon (not shown as mentioned above) may occur according to a "role reversal" where the tag 28 is responsible for determining its location, i.e., after first receiving a beacon advertisement that can be a trigger for the location determination process to begin at the tag 28. An exemplary discussion of one or more aspects which are descriptive of the reversal are provided in U.S. Pat. No. 10,708,970 entitled, "BLE NETWORKING SYSTEMS AND METHODS PROVIDING CENTRAL AND PERIPHERAL ROLE REVERSAL WITH ENHANCED PERIPHERAL LOCATION DETERMINATION USING CONSTANT TONE EXTENSION ANALYSIS FOR A SAME CHANNEL," which is commonly owned by the assignee of the present application and incorporated by reference herein. Analogously, a respective tag 28 and beacon pair may, according to embodiments herein, execute such same role reversal so as to thereafter employ UWB communications following any aforesaid XLE communications.

It is to be understood by one of ordinary skill in the art that each of the tag 28 and each beacon 12, 14, 16, 18, 20, 22, 24, and 26 may be implemented by all appropriate software and/or hardware for carrying out location technologies included in the discussion herein, e.g., self-localizing or TDOA measurements according to a UWB protocol.

In the carrying out of processes according to these technologies and in advance thereof (e.g., synchronization and self-localization of nodes), it can be of the utmost benefit to weigh energy consumption according to wireless communications protocols with which each of a tag 28 and a beacon may be equipped. Such weighing, for instance, may be impacted by certain constraints of one or more of these protocols, e.g., line of sight impediments which are characteristic of UWB. That is, it can be beneficial to first attempt communications between nodes according to a protocol, such as XLE, which is freed of these and other impediments when first engaging in communications between nodes. In a case when the communications are thus established, further operable protocol, such as UWB, can then be employed. In this way, implementation of the initial communication can reduce energy consumption (e.g., by avoiding line of sight impediment(s)) where, for instance and as is understood, XLE communication can be more economical than that of UWB in a process of, for example, communicating one or more parameters governing a self-localizing frame (as for beacons) and/or sequencing for a TDOA frame.

As is known, self-localization of beacons in a RTLS system involves manner of situating positions of those beacons so that such positions can contribute to, for instance, measurement of a position of a tag 28 during TDOA analysis. Impediments to this process can, in some cases, include the initial physical placement of the beacons such as where the beacons are distributed across a large facility (e.g., a warehouse), as well as a manner of evenly and effectively receiving and executing coordinated beacon communications (either among beacons or otherwise) to achieve self-localizing measurement(s).

Figure 2:
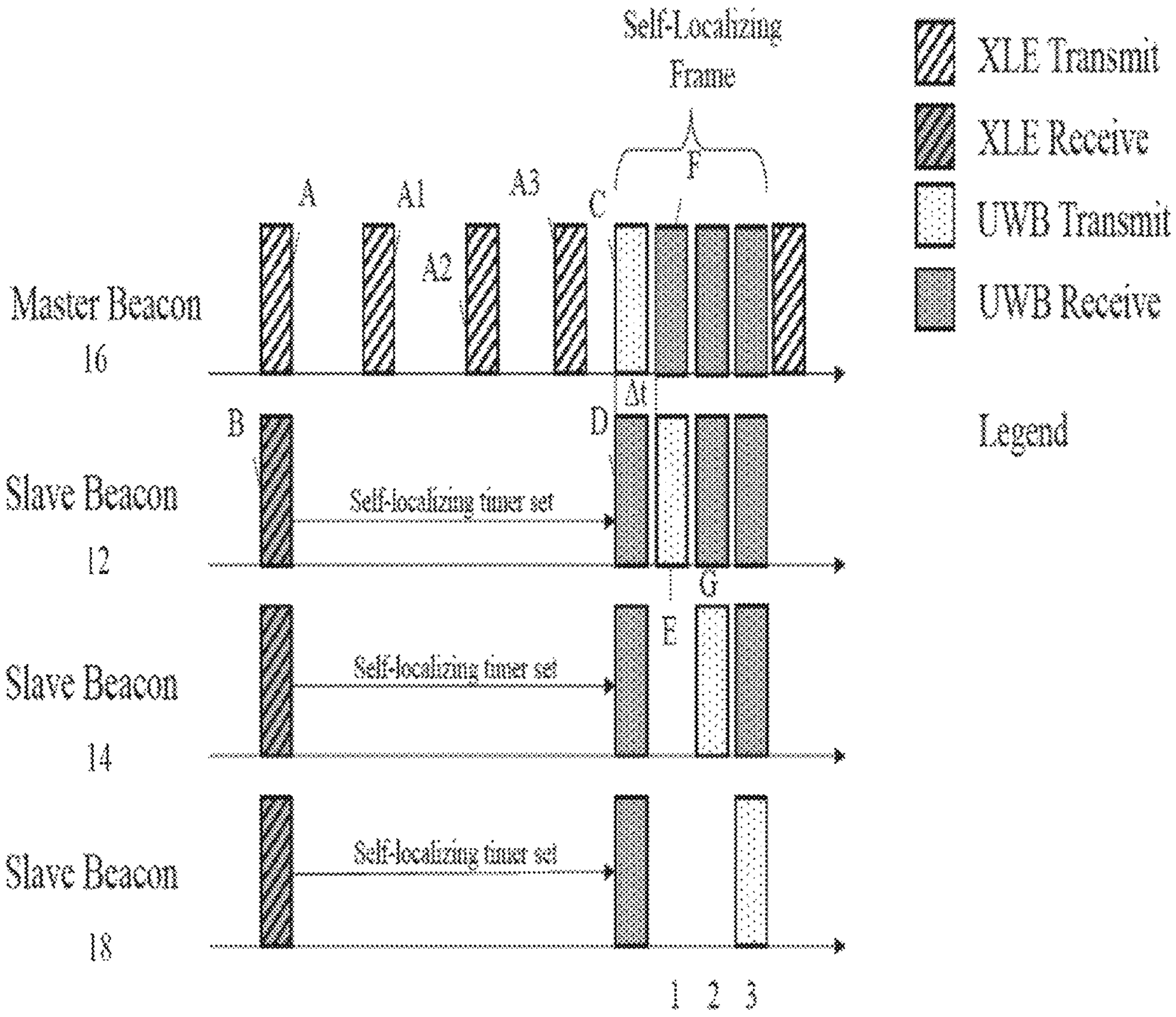
FIG. 2 is a schematic diagram illustrating communications among affiliated beacons of a beacon pod when accomplishing the self-localizing measurements according to FIG. 1.
Figure 3:
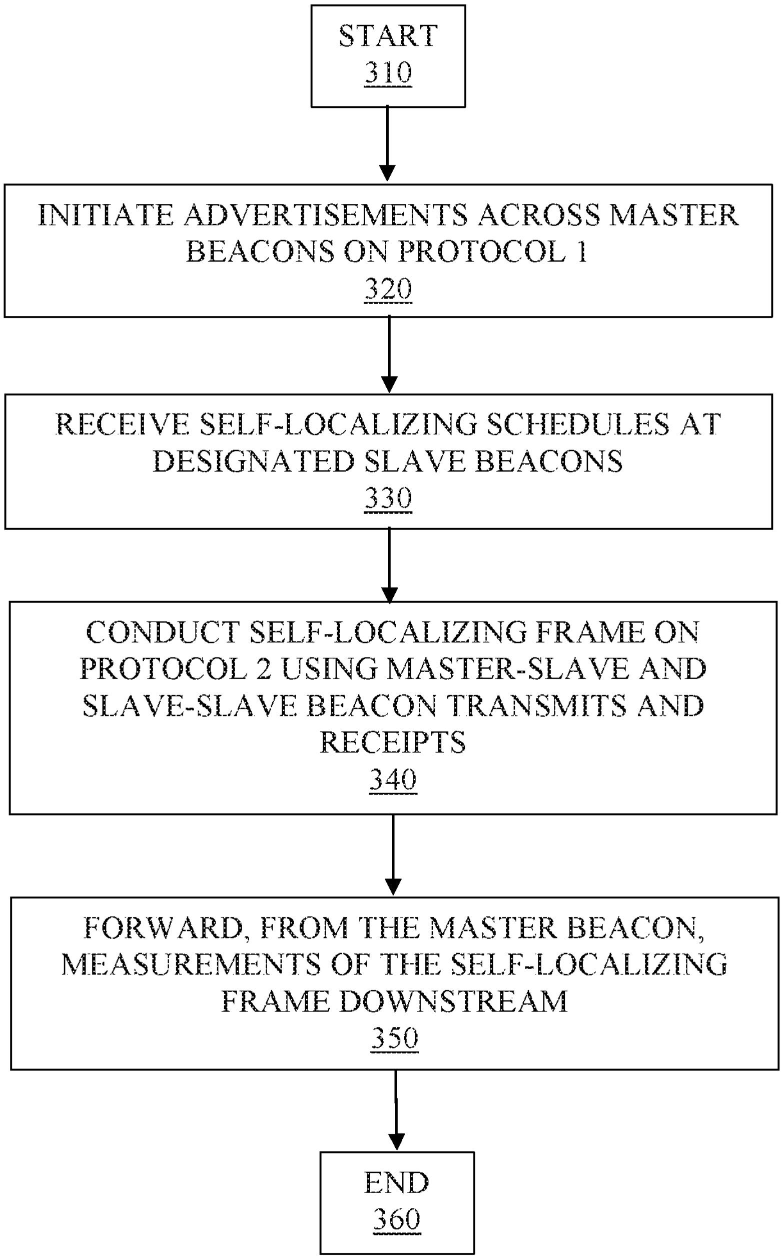
FIG. 3 is a sequence diagram illustrating, in accordance with the self-localization for beacons illustrated in FIGS. 1-2, communications among the beacons that enable the self-localization.

When read in conjunction, FIGS. 2-3 set forth one or more embodiments for determining self-localization measurements of beacons in respective beacon pods, such that the above-described impediments may be overcome. In particular, FIG. 2 sets forth communications among affiliated beacons of a beacon pod when accomplishing the self-localizing measurements, and FIG. 3 emphasizes a sequence for such communications. In particular, the self-localizing measurements can result during a series of self-localizing communications frames according to FIG. 2, such that ground measurements (e.g., between SBs) may be acquired. For instance, the ground measurements may encompass one or more self-localizing measurements acquired in a self-localizing frame preceding an ongoing self-localizing frame. Here, the beacons can be affiliated with each other according to their media access control (MAC) address, such that a MB of P1 or P2 (see FIG. 1) can direct its broadcasts accordingly.

Thus, in referring to FIGS. 2-3, MB 16 of exemplary beacon pod can begin the localization process for its affiliated beacons by broadcasting signaling at "A" (and which signaling is repeated from "A1" to "A3" to optimize capture), see 320 in FIG. 3. The signaling can, with reference to 330 in FIG. 3, include a self-localizing schedule transmitted on protocol 1, or XLE, so as to, for example, minimize energy consumption among receiving SBs, such receipt being indicated at "B." In this regard, the schedule can, for respective SBs 12, 14, and 18 of exemplary P1 delineate a self-localizing timer by which after receipt of the broadcast at "B" the SBs are set to a sleep state and awaken at the expiration thereof. In this way and with reference to 340 in FIG. 3, the MB 16 is set to conduct, for its affiliated beacons, a self-localizing frame using protocol 2, or UWB (so as to, for example, reduce multipath effect), and according to, as will be explained, respective master-slave and slave-slave transmits and receipts.

Initiation of the self-localizing frame and execution of constituent transmits and corresponding receipts of signaling among both the MB 16 and its affiliated SBs and the SBs themselves enables the MB 16 to calculate the respective distances between itself and affiliated SBs, as well as the distance between SBs. Such distances can then be forwarded from the MB 16 downstream to a processor (enabled by, for example, client 34) capable of executing an algorithm (e.g., multidimensional scaling) that can configure a mapping of the respective beacons for beacon pods which engaged in the processes of FIGS. 2-3.

In this regard, and when referring specifically again to FIG. 2, a self-localizing frame, of a series thereof, can begin at "C" with broadcast on protocol 2, or UWB, of signaling from the MB 16 (i.e., first signaling herein) coinciding with expiration of the self-localizing timer broadcasted at "A." Thereafter, the broadcast is received at each of the affiliated SBs at iterations of "D," whereby completion of the respective MB 16 broadcast triggers the MB 16 to transition from a transmit mode to a receipt mode, as is indicated at iterations of "F," for the remainder of the frame. In the interim, each SB, following receipt of the MB advertisement, reverts to a sleep state to await a slotted transmission time, included in the self-localizing schedule broadcasted at "A," and indicated by Δt (as in the case of SB 12, and respectively 2Δt and 3Δt as regards SB 14 and SB 18). That is, each SB transmission slot may be indicated at "1," "2," and "3," respectively, since each respective multiple of Δt represents a differential in time from when the advertisement from the MB 16 occurred at "C" and when the respective SB was scheduled to transmit, according to the self-localizing schedule. Where each SB slotted transmission occurs at respective iterations of "E," such respective transmissions are each received at iterations of "F." In this way, the MB 16 may be configured to calculate the distance between itself and each of the SBs 12, 14, and 18 according to $d_{MB\text{-}SB}=0.5c(r_{rx_{MB\text{-}SB}}-t_{txMB}-\Delta t_{SB})$, where $d_{MB\text{-}SB}$ corresponds to the distance between the MB 16 and a respective SB, c is the speed of light, $r_{rx_{MB\text{-}SB}}$ corresponds to the receive timestamp of a respective SB's signal at the MB 16, $t_{txMB}$ corresponds to the UWB transmission timestamp of the MB 16, and $\Delta t_{SB}$ corresponds to a receive-to-transmit time of a respective SB, which is included in that SBs response payload (such as at "E").

Similarly as in the case where MB 16 was triggered to transition to a receive mode upon completion of its broadcast at "C," two (2) affiliated SBs (e.g., SBs 12 and 14 of P1) are likewise triggered to make the same transition, whereas it will be understood that, for instance SB 18 is not caused to receive transmissions of any kind and does not make such a transition (see, for example, indicated absence of receipt of transmission by SB 18 from SB 14 in FIG. 1). For instance, upon completion of its (second signaling, herein.) transmission at "E corresponding to appointed transmission slot "1," SB 12 switches its radio to receive mode at "G," as does SB 14 upon completion of its transmission at appointed transmission slot "2." This way, when SB 12 transmits at "E" to MB 16, it may include in that transmission its receive timestamp for the iteration "E" (third signaling, herein,) transmission from SB 14 corresponding to a preceding self-localizing frame (i.e., as a result of receipt of SB 14's transmission by SB 12 at "G"). Such a same cycle, without SB 18 being caused to enter a receipt mode), may be repeated by SB 14 with respect to receipt of (fourth signaling, herein,) transmission by SB 18 at appointed transmission slot "3", as is shown in FIG. 2. Thus, as can be appreciated, transmit and receive cycling as between respective SBs (e.g., SBs 12 and 14) can be understood to provide serial staging of communications therebetween at least a pair of the SBs (e.g., SBs 14 and 12 and SBs 14 and 18). Resultingly, the MB 16 is equipped to calculate the distance between SBs according to $d_{ab}=c(r_{rx_{ab}}-\Delta t_b-r_{rx_{aMB}})+d_{mb}-d_{ma}$, in which respective SBs are designated generically as "a" and "b," whereas $d_{ab}$ corresponds to the distance between $SB_a$ and $SB_b$, c is the speed of light, $r_{rx_{ab}}$ corresponds to the receive timestamp of $SB_b$'s signal at $SB_a$, $\Delta t_b$ corresponds to the receive-to-transmit time for $SB_b$ (as included in the $SB_b$'s response payload), $r_{rx_{aMB}}$ corresponds to the receive timestamp of the MB's signal at $SB_a$, $d_{mb}$ corresponds to the distance between the MB and $SB_b$, and $d_{ma}$ corresponds as is calculated hereinabove.

While the above discussion sets forth measurement processes for a single self-synchronization frame, it is to be understood that such processes may be repeated for as many of such frames as is desired when constructing a mapping of relevant beacon pods. When doing so, a running average for each measurement may be calculated at a relevant MB and then forwarded, by the MB, to the processor as described hereinabove.

Accordingly, one of ordinary skill in the art will appreciate from the embodiments described herein that relevant pod beacons engage in a serialized staging of communications enabling the MB to measure both the relative distances between itself and its affiliated SBs as well as those distances between constituent SBs. In these ways, and through strategic placement of the beacons, a mapping of relative beacon positioning, achieved through the described manner of self-localization, can be quickly and accurately achieved.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A real-time location system (RTLS), comprising:

in a beacon pod comprising a master beacon (MB) and at least first through third slave beacons (SBs), the SBs being in communication with the MB and a portion of the at least first through third SBs being serially in communication with each other during a self-localization frame, of a series thereof, in which the communications yield self-localizing measurements corresponding to the MB and the SBs.

2. The RTLS of claim 1, wherein:

the self-localizing measurements are determined at the MB.

3. The RTLS of claim 1, wherein:

the communications during the self-localization frame are scheduled according to a self-localization schedule transmitted to the SBs on a first protocol (P1) comprising BLUETOOTH LOW ENERGY (BLE) prior to the self-localization frame being initiated.

4. The RTLS of claim 3, wherein:

the MB initiates the self-localization frame according to first signaling transmitted from the MB to each of the SBs on a second protocol (P2) comprising ULTRA-WIDEBAND (UWB).

5. The RTLS of claim 4, wherein:

completion of the signaling transmitted from the MB triggers the MB to operate in a receive mode according to the P2.

6. The RTLS of claim 5, wherein:

according to the self-localization schedule, a first of the SBs transmits, according to the P2, second signaling received at the MB, whereby the MB measures the distance between the MB and the first of the SBs based on the first and second signaling.

7. The RTLS of claim 6, wherein:

completion of the second signaling transmitted by the first of the SBs triggers the first of the SBs to operate in a receive mode according to the P2.

8. The RTLS of claim 7, wherein:

according to the self-localization schedule, at least one of the portion of the SBs being serially in communication with each other transmits, according to the P2, third signaling received at the first of the SBs and the MB, and including a receive timestamp of the third signaling at the first of the SBs, the receive timestamp corresponding to said third signaling occurring for and during a preceding self-localization frame.

9. The RTLS of claim 8, wherein:

the MB measures the distance between the first of the SBs and the at least one of the portion of the SBs being serially in communication with each other based at least on the receive timestamp of the third signaling at the first of the SBs.

10. The RTLS of claim 9, wherein:

completion of the third signaling transmitted by the at least one of the portion of the SBs being serially in communication with each other triggers the at least one of the portion of the SBs being serially in communication with each other to operate in a receive mode according to the P2.

11. The RTLS of claim 10, wherein:

according to the self-localization schedule, at least another of the portion of the SBs being serially in communication with each other transmits, according to the P2, fourth signaling received at the at least one of the portion of the SBs being serially in communication with each other and the MB, and including a receive timestamp of the fourth signaling at the at least one of the portion of the SBs being serially in communication with each other, the receive timestamp corresponding to said fourth signaling occurring for and during a preceding self-localization frame.

12. The RTLS of claim 11, wherein:

the MB measures the distance between the at least another and the at least one of the portion of the SBs being serially in communication with each other based at least on the receive timestamp of the fourth signaling at the at least one of the portion of the SBs being serially in communication with each other.

13. The RTLS of claim 12, wherein:

the MB transmits the distances measured by the MB to a processor configured to determine a mapping of the relative positions of the MB and each of the SBs.

14. A method of operating a real-time location system (RTLS), comprising:

providing a beacon pod comprising a master beacon (MB) and at least first through third slave beacons (SBs), the SBs communicating with the MB and a portion of the at least first through third SBs communicating with each other during a self-localization frame, of a series thereof, in which the communications yield self-localizing measurements corresponding to the MB and the SBS.

15. The method of claim 14, further comprising:

determining the self-localizing measurements at the MB.

16. The method of claim 14, wherein:

the communications during the self-localization frame are scheduled according to a self-localization schedule transmitted to the SBs on a first protocol (P1) comprising BLUETOOTH LOW ENERGY (BLE) prior to the self-localization frame being initiated.

17. The method of claim 16, wherein:
the MB initiates the self-localization frame according to first signaling transmitted from the MB to each of the SBs on a second protocol (P2) comprising ULTRA-WIDEBAND (UWB).

18. The method of claim 17, wherein:
completion of the signaling transmitted from the MB triggers the MB to operate in a receive mode according to the P2.

19. The method of claim 18, wherein:
according to the self-localization schedule, a first of the SBs transmits, according to the P2, second signaling received at the MB, whereby the MB measures the distance between the MB and the first of the SBs based on the first and second signaling.

20. The method of claim 19, wherein:
completion of the second signaling transmitted by the first of the SBs triggers the first of the SBs to operate in a receive mode according to the P2.

21. The method of claim 20, wherein:
according to the self-localization schedule, at least one of the portion of the SBs being serially in communication with each other transmits, according to the P2, third signaling received at the first of the SBs and the MB, and including a receive timestamp of the third signaling at the first of the SBs, the receive timestamp corresponding to said third signaling occurring for and during a preceding self-localization frame.

22. The method of claim 21, further comprising:
measuring, by the MB, the distance between the first of the SBs and the at least one of the portion of the SBs being serially in communication with each other based at least on the receive timestamp of the third signaling at the first of the SBs.

23. The method of claim 22, wherein:
completion of the third signaling transmitted by the at least one of the portion of the SBs being serially in communication with each other triggers the at least one of the portion of the SBs being serially in communication with each other to operate in a receive mode according to the P2.

24. The method of claim 23, wherein:
according to the self-localization schedule, at least another of the portion of the SBs being serially in communication with each other transmits, according to the P2, fourth signaling received at the at least one of the portion of the SBs being serially in communication with each other and the MB, and including a receive timestamp of the fourth signaling at the at least one of the portion of the SBs being serially in communication with each other, the receive timestamp corresponding to said fourth signaling occurring for and during a preceding self-localization frame.

25. The method of claim 24, further comprising:
measuring, by the MB, the distance between the at least another and the at least one of the portion of the SBs being serially in communication with each other based at least on the receive timestamp of the fourth signaling at the at least one of the portion of the SBs being serially in communication with each other.

26. The method of claim 25, further comprising:
transmitting, by the MB, the distances measured by the MB to a processor configured to determine a mapping of the relative positions of the MB and each of the SBs.

* * * * *